S. W. KLASS.
EGG TESTING DEVICE.
APPLICATION FILED JULY 5, 1913.

1,097,446.

Patented May 19, 1914.

Witnesses
F. Otto
H. C. Van Ryn

Inventor
Samuel W. Klass
By Erwin & Wheeler
Attorneys

UNITED STATES PATENT OFFICE.

SAMUEL W. KLASS, OF WAUKESHA, WISCONSIN, ASSIGNOR TO ARTHUR W. F. KLASS, OF WAUKESHA, WISCONSIN.

EGG-TESTING DEVICE.

1,097,446.　　　　　Specification of Letters Patent.　　Patented May 19, 1914.

Application filed July 5, 1913. Serial No. 777,386.

*To all whom it may concern:*

Be it known that I, SAMUEL W. KLASS, a citizen of the United States, residing at Waukesha, county of Waukesha and State of Wisconsin, have invented new and useful Improvements in Egg-Testing Devices, of which the following is a specification.

My invention relates to improvements in egg testing devices.

The object of my invention is to provide an egg testing device or apparatus adapted to be used for testing incubator eggs, in which an egg tray may be taken from the incubator with the eggs thereon, placed in the tester and all the eggs in the tray speedily tested and the tray returned to the incubator without disturbing or turning the eggs, other than those found to be defective.

Figure 1:
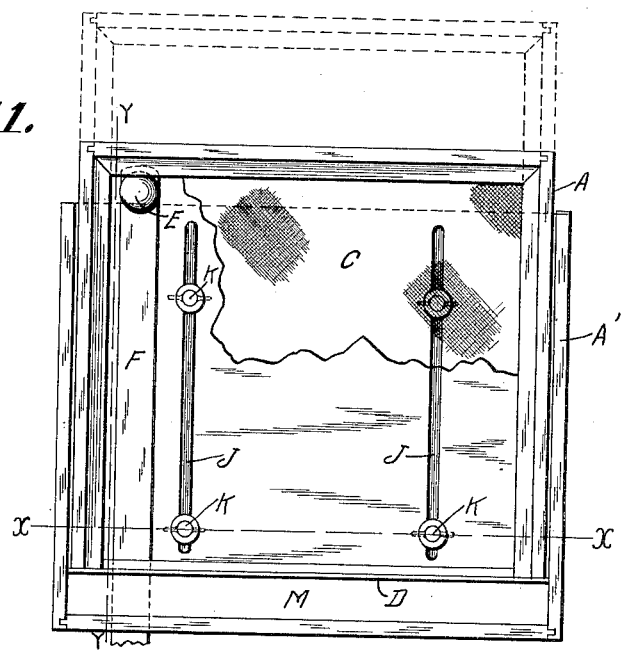
Figure 2:
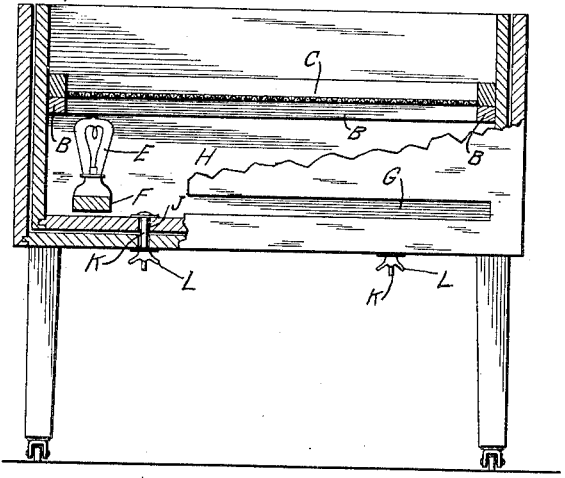
Figure 3:
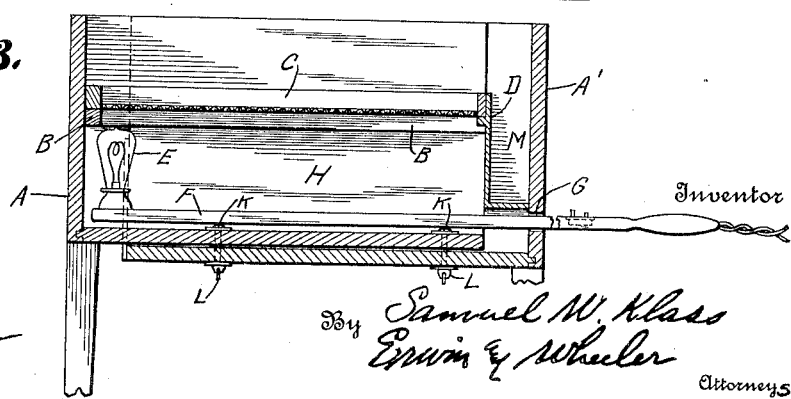

In the drawings—Figure 1 is a plan view of a testing device embodying my invention. Fig. 2 is a sectional view drawn on line $x$—$x$ of Fig. 1. Fig. 3 is a sectional view drawn on line $y$—$y$ of Fig. 1.

Like parts are identified by the same reference characters throughout the several views.

A cabinet, open at the top, is provided with a ledge B adapted to receive an egg tray C of any ordinary type, such as are used in incubators. The cabinet may be in the form of a simple box open at the top, or it may comprise a set of telescoping members A and A', each in the form of a box open at the top and at one end, the member A being narrower than the member A', and adapted to slide within the member A' from front to rear, as shown. The rear end of the member A is open and the front end of the member A' is open, so that trays C of differing lengths may be mounted in the member A upon the ledge B and project rearwardly through the open end of the member A into abutting contact with a partition wall D near the rear end of the member A'.

A lamp E, preferably an electric lamp, is mounted upon a bar F which projects through a slot G in the wall of the cabinet, whereby the bar F may be manipulated from the exterior and the lamp E adjusted to any desired position in the space H between the bottom of the cabinet and the egg tray. The bottom of one of the members A or A', (preferably the member A), is provided with slots J. Bolts K project downwardly through the bottom walls of the members A and A', and the bottom of the member A' may also be provided with slots or holes to receive these bolts. The bolts K are required to clamp the members together in any desired position of adjustment, clamping thumb nuts L being employed for this purpose.

In use the members A and A' will be adjusted to form a cabinet of the proper size to receive the egg trays of any given incubator. The thumb nuts L will then be turned to clamping position, after which an egg tray may be taken from the incubator, placed in the cabinet upon the ledges B, and the lamp E moved along the rows of eggs underneath the same, the several eggs being inspected by the operator from above as the light passes underneath them. Eggs found to be defective will be removed and placed in the compartment M between the wall D and the rear end of the member A'. If desired, the defective eggs may be classified as infertile and bad eggs, those of one class being placed in the compartment M and those of the other in the compartment H, until the inspection is completed. As soon as the inspection is completed, the tray will be removed and placed in the incubator and another tray substituted therefor in the testing device.

I attach great importance to the fact that my device is adapted to receive egg trays from an incubator without disturbing the eggs in the trays. It is well known that the germ of an egg will float or move from one position to another when the egg is disturbed. After a period of rest, the germ rises to the upper portion of the egg and in this position, inspection can be easily made from above with a light underneath the egg and the rays thereof directed through it to the eye of the observer. My improved apparatus, therefore, permits all the eggs in a tray to be quickly and rapidly inspected since all eggs containing live germs will have the germs exposed in the most favorable position to be detected by the observer. By forming the device in such a manner that it is expansible to receive trays of differing sizes, my device is adapted to be used in connection with any incubator, and since the walls of the device, when properly adjusted, will be in close proximity to the several margins of the tray, the rays of light will be obstructed except as they pass through the eggs, and the cabinet, therefore, may virtually serve as a dark room in which the eggs may be rapidly inspected.

In the drawings the cabinet is illustrated as expansible only toward the front and rear. It is not regarded as necessary to extend the side walls laterally for the reason that egg trays for different incubators seldom vary in width.

I claim—

1. An egg testing device comprising a cabinet provided with interior tray receiving ledges and slotted below said ledges, a bar extending through said slot and provided with a source of illumination, said cabinet being of proper size and shape to receive egg trays from an incubator.

2. An egg testing device comprising a cabinet provided with interior tray receiving ledges and slotted below said ledges, a bar extending through said slot and provided with a source of illumination, said cabinet being of proper size and shape to receive egg trays from an incubator, and said cabinet being also formed in movable sections adapted to be adjusted upon each other to increase or diminish the dimensions of the cabinet to accommodate trays of differing sizes.

3. An egg testing device comprising an expansible cabinet having interior ledges adapted to receive and support incubator egg trays of different size, said cabinet having side walls sliding upon each other, and coöperating with the end walls to inclose an egg tray when the cabinet is in either an expanded or contracted position, and means within the cabinet for illuminating the eggs in such egg trays from the under side.

4. An egg testing device comprising a cabinet provided with interior tray receiving ledges and slotted below said ledges, a bar extending through said slot and provided with a source of illumination, said cabinet being of proper size and shape to receive egg trays from an incubator, said cabinet being subdivided by partition walls into storage compartments for eggs removed from the trays.

In testimony whereof I affix my signature in the presence of two witnesses.

SAMUEL W. KLASS.

Witnesses:
 LEVERETT C. WHEELER,
 OLIVER DER HOFFMAN.

---

Copies of this patent may be obtained for five cents each, by addressing the "Commissioner of Patents, Washington, D. C."